(12) United States Patent
Kraemer et al.

(10) Patent No.: US 9,797,212 B2
(45) Date of Patent: Oct. 24, 2017

(54) METHOD OF TREATING SUBTERRANEAN FORMATION USING SHRINKABLE FIBERS

(71) Applicant: SCHLUMBERGER TECHNOLOGY CORPORATION, Sugar Land, TX (US)

(72) Inventors: Chad Kraemer, Katy, TX (US); Dmitry Viktorovich Badazhkov, Novosibirsk (RU); Bruno Lecerf, Sugar Land, TX (US); Alexey Alekseev, Novosibirsk (RU); Ksenia Kaprielova, Novosibirsk (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 180 days.

(21) Appl. No.: 14/486,720

(22) Filed: Sep. 15, 2014

(65) Prior Publication Data

US 2015/0275607 A1 Oct. 1, 2015

Related U.S. Application Data

(60) Provisional application No. 61/973,033, filed on Mar. 31, 2014.

(51) Int. Cl.
*E21B 33/138* (2006.01)
*E21B 33/13* (2006.01)
*E21B 33/00* (2006.01)
*E21B 21/00* (2006.01)
(Continued)

(52) U.S. Cl.
CPC ............. *E21B 33/00* (2013.01); *C09K 8/501* (2013.01); *C09K 8/516* (2013.01); *E21B 21/003* (2013.01); *E21B 33/138* (2013.01); *C09K 2208/08* (2013.01)

(58) Field of Classification Search
CPC ...... E21B 33/00; E21B 33/1208; E21B 33/12; E21B 33/138; E21B 33/13
See application file for complete search history.

(56) References Cited

U.S. PATENT DOCUMENTS

| | | |
|---|---|---|
| 3,727,688 A | 4/1973 | Clampitt |
| 4,454,861 A | 6/1984 | Grenier |
| 4,779,575 A | 10/1988 | Perkins |

(Continued)

FOREIGN PATENT DOCUMENTS

| | | |
|---|---|---|
| EA | 200701378 A1 | 6/2008 |
| EP | 1556458 B1 | 1/2007 |

(Continued)

OTHER PUBLICATIONS

International Search Report and Written Opinion issued in PCT/US2015/023282 dated Jun. 25, 2015, 14 pages.

(Continued)

*Primary Examiner* — Catherine Loikith
(74) *Attorney, Agent, or Firm* — Andrea E. Tran (57) ABSTRACT

A method for treating a subterranean formation utilizing a slurry having a plurality of shrinkable material. The method of treatment may include a diversion treatment during a fracturing operation. The shrinkable material may be adapted to shrink in response to a temperature change. The slurry may be used to perform a plugging of a perforation or fracture in the formation.

19 Claims, 3 Drawing Sheets

(51) Int. Cl.
*C09K 8/50* (2006.01)
*C09K 8/516* (2006.01)

(56) References Cited

U.S. PATENT DOCUMENTS

| | | |
|---|---|---|
| 4,857,399 A | 8/1989 | Vicik et al. |
| 5,330,005 A | 7/1994 | Card et al. |
| 5,567,796 A | 10/1996 | Nakatsukasa et al. |
| 5,635,298 A | 6/1997 | Delker |
| 5,688,594 A | 11/1997 | Lichscheidt et al. |
| 5,908,073 A | 6/1999 | Nguyen et al. |
| 6,599,863 B1 | 7/2003 | Palmer et al. |
| 6,837,309 B2 | 1/2005 | Boney et al. |
| 6,844,062 B2 | 1/2005 | Matsui et al. |
| 6,844,063 B2 | 1/2005 | Matsui et al. |
| 7,044,220 B2 | 5/2006 | Nguyen et al. |
| 7,228,904 B2 | 6/2007 | Todd et al. |
| 7,267,170 B2 | 9/2007 | Mang et al. |
| 7,275,596 B2 | 10/2007 | Willberg et al. |
| 7,281,581 B2 | 10/2007 | Nguyen et al. |
| 7,325,608 B2 | 2/2008 | Van Batenburg et al. |
| 7,380,600 B2 | 6/2008 | Willberg et al. |
| 7,380,601 B2 | 6/2008 | Willberg et al. |
| 7,398,826 B2 | 7/2008 | Hoefer et al. |
| 7,413,017 B2 | 8/2008 | Nguyen et al. |
| 7,565,929 B2 | 7/2009 | Bustos et al. |
| 7,581,590 B2 | 9/2009 | Lesko et al. |
| 7,612,000 B2 | 11/2009 | Nishida et al. |
| 7,665,522 B2 | 2/2010 | Sullivan et al. |
| 7,833,950 B2 | 11/2010 | Willberg et al. |
| 7,845,413 B2 | 12/2010 | Shampine et al. |
| 7,846,517 B2 | 12/2010 | McDaniel et al. |
| 7,851,391 B2 | 12/2010 | Bond et al. |
| 8,021,760 B2 | 9/2011 | Boyter et al. |
| 8,061,424 B2 | 11/2011 | Willberg et al. |
| 8,066,068 B2 | 11/2011 | Lesko et al. |
| 8,167,043 B2 | 5/2012 | Willberg et al. |
| 8,230,925 B2 | 7/2012 | Willberg et al. |
| 8,281,857 B2 | 10/2012 | Willberg et al. |
| 8,353,344 B2 | 1/2013 | Carlson et al. |
| 8,371,381 B2 | 2/2013 | Shindgikar et al. |
| 2002/0122937 A1 | 9/2002 | Sudo et al. |
| 2005/0045337 A1* | 3/2005 | Bansal ............... E21B 21/08 166/369 |
| 2005/0061512 A1* | 3/2005 | Reid ............... E21B 36/005 166/335 |
| 2007/0298273 A1 | 12/2007 | Thies et al. |
| 2008/0009423 A1* | 1/2008 | Mang ............... D01D 5/24 507/219 |
| 2008/0039345 A1 | 2/2008 | Kippie et al. |
| 2008/0135245 A1 | 6/2008 | Smith et al. |
| 2008/0210423 A1 | 9/2008 | Boney |
| 2008/0236832 A1 | 10/2008 | Fu et al. |
| 2009/0286700 A1 | 11/2009 | Lesko et al. |
| 2010/0137527 A1 | 6/2010 | Iwamoto et al. |
| 2010/0227166 A1 | 9/2010 | Miyauchi et al. |
| 2010/0263870 A1 | 10/2010 | Willberg et al. |
| 2010/0288500 A1 | 11/2010 | Carlson et al. |
| 2011/0083849 A1 | 4/2011 | Medvedev et al. |
| 2011/0180259 A1 | 7/2011 | Willberg et al. |
| 2011/0183874 A1 | 7/2011 | Ghassemzadeh |
| 2011/0240293 A1 | 10/2011 | Lesko et al. |
| 2011/0272159 A1 | 11/2011 | Osiptsov et al. |
| 2012/0067581 A1 | 3/2012 | Auzerais et al. |
| 2012/0129737 A1 | 5/2012 | Lesko et al. |
| 2012/0247764 A1 | 10/2012 | Panga et al. |
| 2012/0325472 A1 | 12/2012 | Litvinets et al. |
| 2013/0056213 A1 | 3/2013 | Medvedev et al. |
| 2013/0134088 A1 | 5/2013 | Dahringer et al. |

FOREIGN PATENT DOCUMENTS

| | | |
|---|---|---|
| EP | 2436749 A1 | 4/2012 |
| JP | 2003221737 A | 8/2003 |
| JP | 2007305225 A | 11/2007 |
| JP | 2008035120 A | 2/2008 |
| JP | 2008113825 A | 5/2008 |
| JP | 2008209444 A | 9/2008 |
| JP | 2009078345 A | 4/2009 |
| JP | 2010204722 A | 9/2010 |
| WO | 9850611 A1 | 11/1998 |
| WO | 0151767 A2 | 7/2001 |
| WO | 2007094897 A2 | 8/2007 |
| WO | 2008068645 A1 | 6/2008 |
| WO | 2010019535 A2 | 2/2010 |
| WO | 2011081546 A1 | 7/2011 |
| WO | 2011081549 A1 | 7/2011 |
| WO | 2013147796 A1 | 10/2013 |
| WO | 2014042548 A1 | 3/2014 |
| WO | 2014042552 A1 | 3/2014 |
| WO | 2015057096 A1 | 4/2015 |
| WO | 2015088827 | 6/2015 |

OTHER PUBLICATIONS

International Search Report and Written Opinion issued in PCT/RU2013/000919 dated Aug. 7, 2014, 7 pages.
Xiang, et al., "A Porous Medium, Model of the Hydroentanglement Process", Journal of Porous Media, vol. 11, No. 1, 2008, pp. 35-49.
Natureworks, "NatureWorks PLA: Shrink Sleeve Labels", 2005, 2 pages.

* cited by examiner

METHOD OF TREATING SUBTERRANEAN FORMATION USING SHRINKABLE FIBERS

CROSS-REFERENCE TO RELATED APPLICATION(S)

This application claims priority to U.S. Provisional Patent Application No. 61/973,033 (entitled "Shrinkable Fibers as Temporary Isolation of Previously Stimulated Wellbore Interval"), filed Mar. 31, 2014. The content of this application is incorporated by reference herein in its entirety.

BACKGROUND

Hydrocarbons (oil, condensate and gas) are typically produced from wells that are drilled into the formations containing them. For a variety of reasons, such as inherently low permeability of the reservoirs or damage to the formation caused by drilling and completion of the well, the flow of hydrocarbons into the well may be low. In this case, the well can be stimulated, using a variety of techniques, including hydraulic fracturing.

During the drilling of a wellbore, various fluids may be used for multiple functions. The fluids may be circulated through a drill pipe and a drill bit into the wellbore, and then may subsequently flow upward through the wellbore to the surface. During the circulation, the a fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate fluids from the formation by providing a sufficient hydrostatic pressure to prevent the ingress of the fluids onto the wellbore, to cool or lubricate the drill string and drill bit, and/or to maximize a penetration rate.

In many well treatments, a fluid may be injected into the well under pressure. If some or all of the fluid leaks of the wellbore, a fluid loss occurs. In certain treatments where fluid is intended to be returned to the surface, such as drilling, some or all of the fluid may not return due to a fluid loss. This is termed "lost circulation." There are numerous products and techniques, such as using polymer pills and cement plugs, to cure lost circulation. One approach is to add a lost circulation material (LCM) into the drilling fluid and/or into the cement or polymer system. LCM systems often contain fibers.

In hydraulic fracturing in particular, a fluid is injected into the formation to initiate and propagate a fracture. Then, a second fluid is injected to keep the fracture open after the pressure is released. During hydraulic fracturing, one or more of the fluids will be pumped into the wellbore until the downhole pressure exceeds the fracture gradient of the rock.

In hydraulic fracturing of horizontal wells and multi-layered formations, diverting techniques may be used to enable fracturing redirection between different zones. Known diverting methods include mechanical isolation devices such as packers, as well as well bore plugs, setting bridge plugs, pumping ball sealers, pumping slurred benzoic acid flakes and removable or degradable particulates.

When diversion using diverting materials is performed downhole, the diversion is generally based upon bridging of some particles of the diverting material and forming a plug by accumulating the rest of the particles at the formed bridge. However, when removable materials are used in a typical treatment diversion, the bridging ability of the diverting slurry may be reduced because of dilution with a wellbore fluid. Further, poor stability of the plug formed from various diverting materials is another concern during such a diversion procedure.

Plugging or diverting a downhole feature with solid diverting materials such as degradable materials may be achieved when the diverting agent is at a high loading (e.g., at a high concentration), such as from about 20 lbs/1000 gal to about 1000 lbs/1000 gal, or from about 40 lbs/1000 gal to about 750 lbs/1000 gal) in order to form temporary plugs or bridges. The solid diverting materials material may also be used at concentrations at least 4.8 g/L (40 lbs/1,000 gal), at least 6 g/L (50 lbs/1,000 gal), or at least 7.2 g/L (60 lbs/1,000 gal). High loading of the solid diverting materials may lead to multiple particle blocking of porous media. However, achieving a high loading of solid diverting materials within a stream of treatment fluid is challenging.

The ability to add a solid into a treatment fluid in a continuous manner with traditional solid feeders so as to be functional in a particular operation downhole (such as a diverting and/or plugging operation) is difficult because the solid feeders are limited in their feeding rates. This is of particular concern for diversion in hydraulic fracturing treatments, for which treatment fluid is to be injected at a high rate, often exceeding 50 barrels (bbl)/min, and where the rate of addition of the solid should be substantial enough to create a stream of high loading solid material.

Plugging a downhole feature may be utilized to address lost circulation. which is defined as the partial or total loss of drilling fluids into the formation; it can take place while drilling, tripping into the hole, running casing or cementing. One approach to remediate to loss circulation consists in sealing fractures with various particulate-based plugging materials.

To aid in a diversion and/or plugging treatment, the solid material to be used may be a degradable material, and such material may be in the form of manufactured shapes such as flakes, fibers and particles. Methods for diversion using degradable materials is described in U.S. Pat. No. 7,380,600, U.S. Pat. No. 8,167,043, U.S. Pat. No. 7,565,929, and U.S. Patent Application Publication No. 2008/0210423, each of which is hereby incorporated by reference in its entirety. However, such known materials may not reliably operate efficiently, may cause congestion when passing through fracturing pumps and the like, and may necessitate substantial user intervention.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The statements made merely provide information relating to the present disclosure, and may describe some embodiments illustrating the subject matter of this application.

In a first aspect, a method for treating a subterranean formation is disclosed. The method may include injecting, into the subterranean formation, a slurry including at least a carrier fluid and a shrinkable material, and forming a plug in a fracture or perforation in the subterranean formation using, at least in part, the shrinkable material. The shrinkable material may be adapted to shrink in response to an increase in temperature of the slurry above a threshold value.

In another aspect, a method for plugging a fracture or perforation of a subterranean formation is disclosed. The method may include injecting a plurality of shrinkable material into a wellbore of the subterranean formation, subjecting the plurality of shrinkable material to a temperature at or above a predetermined temperature threshold, thereby shrinking the plurality of shrinkable material, and plugging the fracture or perforation with the plurality of shrunk material and the particles.

In another aspect, a method is disclosed. The method may be a method for plugging a fracture or perforation of a subterranean formation using a slurry comprising a plurality of shrinkable material and particles. The method may include subjecting the plurality of shrinkable material to a temperature at or above a predetermined temperature threshold. Further, after at least some of the plurality of shrinkable material is shrunk, the method may include injecting the slurry comprising the plurality of shrinkable material and the plurality of particles into a wellbore. The method may additionally include plugging the fracture or perforation with the plurality of shrunk material.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the slurry used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The following definitions are provided in order to aid those skilled in the art in understanding the detailed description.

The term "injecting" describes the introduction of a new or different element into a first element. In the context of this application, injection of a fluid, solid or other compound may occur by any form of physical introduction, including but not limited to pumping.

The term "fracturing" refers to the process and methods of breaking down a geological formation and creating a fracture, i.e., the geological formation around a wellbore, in order to increase production rates from a hydrocarbon reservoir. The fracturing methods otherwise use techniques known in the art.

The term "near field of fracture" relates to a distance from a surface of the wellbore. A distance within the near field may be a distance of 0 to about 50 feet from the wellbore surface, or 0 to about 10 feet from the wellbore surface, or 0 to about 5 feet from the wellbore surface.

The term "degradable materials" refers to a material that will at least partially degrade (for example, by cleavage of a chemical bond) within a desired period of time such that no additional intervention is used to remove the plug. For example, at least 30% of the material may degrade, such as at least 50%, or at least 75%. In some situations, 100% of the material may degrade. The degradation of the removable material may be triggered by a temperature change, and/or by chemical reaction between the material and another reactant. Degradation may include dissolution of the material.

The terms "shrinkable materials" and "shrinkable fibers" refer to materials or fibers that have the capacity to reduce in at least one size dimension, such as length, diameter, mass and/or volume in response to a given stimulus, including but not limited to an increase in temperature.

A diverting or plugging operation may involve controlling a particular fracture, perforation or opening by injecting a plugging material into an appropriate location, so as to, for example, protect from fluid loss at the fracture or perforation. The plugging operation may use materials, such as shrinkable materials including shrinkable fibers that can create a blocking effect. In certain applications such as fracturing, the plugging of the fracture leads to diversion of the fluid elsewhere along the wellbore. In other applications such as loss circulation mitigation, the plugging material may prevent further loss of fluid in the formation. The blocking effect may be temporary and may be removed, for example, by degradation of the material, following the treatment.

In some embodiments, a fracturing treatment is performed. The method may first involve hydraulic fracturing, and can be used in vertical wells, horizontal wells, or a combination thereof. The hydraulic fracturing may include pumping a fracturing fluid into a wellbore until a predetermined time. The predetermined time may be a time where the downhole pressure exceeds a fracture gradient of the rock.

To enable a fracture to remain open for an amount of time, a propping agent may be introduced into the fracture. The propping agent may include any suitable solid material, including but not limited to sand, ceramic materials, gels, and foams.

In some embodiments, before, after or while a hydraulic fracture is initiated, the method may involve designing a slurry and treatment schedule. The slurry and treatment schedule may be used for diverting or plugging a fracture, or more generally for any purpose within the context of a fracturing treatment. The slurry may include a slurry and/or pill having degradable material. The degradable material may include a plurality of shrinkable fibers. The slurry may include additional particles, such as small particles, in addition to the plurality of shrinkable fibers.

Shrinkable materials may include single-component materials, for example polylactic acid fibers. In general, fibers made from amorphous polymers may be shrinkable. Shrinkable fibers may be included within suitable shrinkable materials, which are typically multicomponent materials, for example multicomponent fibers, for example two-component fibers. The initial shapes of suitable shrinkable materials include fibers, films, ribbons, platelets, flakes and other shapes having an aspect ratio of greater than about 20 (the aspect ratio of a flake, ribbon or film is the ratio of the average surface area to the average thickness). Common structures of multicomponent fibers, for example side-by-side, sheath-core, segmented pie, islands-in-the-sea, and combinations of such configurations, and methods of forming such multicomponent fibers, are well known to those of ordinary skill in the art of making fibers. For example, such fibers and methods of making them are described in U.S. Pat. No. 7,851,391, which is hereby incorporated by reference in its entirety. The differences in the compositions of the different components, and their consequent differences in behavior when subjected to changes in conditions downhole (such as differences in shrinkage or elongation with differences in temperature or with sorption of fluids such as oil and water or, with differences of sorption of fluids such as oil and water, or with changes in pH or salinity) are responsible for the changes in shape.

For shrinkable materials in the shape of shrinkable fibers, the fibers may have a capability to shrink from about 20 to about 80 percent of their initial length, or from shrinkage of from about 40 to about 70 percent, although less or more shrinkage is suitable. Other suitable materials may readily be identified or conceived of by readers of this disclosure.

One example of suitable shrinkable material is two-component fibers made of a core material and a sheath material that have different melting points. The core material (for example a thermoplastic resin, for example a polypropylene or a polyester) normally is used to ensure the integrity of the material during use; this core is not normally melted as the shrinkable material is reshaped, and may, for example, form a three-dimensional network in the newly shaped subsequent structure, giving the subsequent structure strength. The sheath material (for example a thermoplastic resin, for example a polyethylene) has a lower melting and bonding temperature and thus may be used to hold the subsequent structure together and in the new shape. The melting point of the sheath material may be about 80° C.; the melting point of the core material may commonly be up to about 160° C. Such materials may be manufactured with the sheath and core eccentric or concentric, and the fibers may be available in conventional form or available commercially already in a crimped (zigzag), wavy, or spiral form. Such fibers are available, for example, from ES Fibervisions™. Such shrinkable fibers are described in U.S. Patent Application Publication No. 2010/0227166, which is herein incorporated by reference.

Another example of suitable shrinkable material is highly shrinkable copolyamide fiber (having high wet heat shrinkage characteristics and low dry heat shrinkage characteristics) as disclosed by Toray Industries, Inc. A suitable fiber is described in JP 08-209444, which is herein incorporated by reference. Another suitable fiber is a staple fiber obtained by extruding a copolyester including (A) isophthalic acid and (B) 2,2-bis{4-(2-hydroxyethoxy)phenyl} propane as copolymerizing components, as described in JP 10-0204722, which is herein incorporated by reference. This latter fiber undergoes less than or equal to 20 percent shrinkage in boiling water, and 12 to 40 percent shrinkage in 160° C. dry air after treating in boiling water.

Yet another example of suitable shrinkable material is a polyester fiber having a diol component and a dicarboxylic acid component; for example the diol may be 1,1-cyclohexanedimethanol or its ester-forming derivative (or biphenyl-2,2'-dicarboxylic acid or its ester-forming derivative) in an amount of 2 to 20 mole percent based on the whole dicarboxylic acid component. Such fibers were disclosed by Kuraray in JP 9-078345 and JP 8-113825, each of which are herein incorporated by reference. Other suitable materials from Kuraray include the polyester fibers described in U.S. Pat. No. 5,567,796, which is herein incorporated by reference.

Nippon Ester Company Ltd. has described several fibers suitable for use as shrinkable materials. A highly shrinkable conjugated fiber disclosed in JP 2003-221737, which is herein incorporated by reference, is composed of a polyester, A, containing polyethylene terephthalate as a main component (prepared by copolymerizing an aromatic dicarboxylic acid having a metal sulfonate group in an amount of from 3 to 7 mole percent based on the whole acid component or an isophthalic acid in an amount of from 8 to 40 mole percent) and a polyester, B, that is ethylene terephthalate. The difference in melting points between polyester A and polyester B is at least 5° C. and the difference between the heat of melting of polyester A and polyester B is at least 20 J/g. The dry heat shrinkage at 170° C. is at least 15 percent.

Another fiber described by Nippon Ester Company Ltd. in JP 08-035120, which is herein incorporated by reference, is a highly shrinkable polyester conjugated fiber obtained by conjugate spinning in a side-by-side fashion of polyethylene terephthalate and a polyethylene terephthalate copolymerized with 8 to 40 mole percent of isophthalic acid at a weight ratio of from 20:80 to 70:30. The product having a single fiber fineness of 1 to 20 denier has a hot water shrinkage at 90° C. of from 70 to 95 percent.

Kaneka Corporation has described several fibers suitable for use as shrinkable materials in embodiments described herein in U.S. Patent Application Publication No. 2002/0122937 and U.S. Pat. No. 7,612,000, each of which are herein incorporated by reference. They include a hollow shrinkable copolymer fiber made of acrylonitrile and a halogen-containing vinyl monomer manufactured by wet spinning followed by steam treatment, drying, and heating. Some examples contain one or more of acrylic acid, methacrylic acid, vinyl chloride, vinylidene chloride, vinyl esters (for example vinyl acetate, vinyl pyrrolidone, vinyl pyridine and their alkyl-substituted derivatives), amides, and methacrylic acid amides. In these references, one of the monomers may be halogen-containing to provide fire-resistance to the fiber; in the present application, this is not necessary. Other examples are modacrylic shrinkable fibers made from 50 to 99 parts by weight of a polymer (A) containing 40 to 80 weight percent acrylonitrile, 20 to 60 weight percent of a halogen-containing monomer, and 0 to 5 weight percent of a sulfonic acid-containing monomer, and 1 to 50 parts by weight of a polymer (B) containing 5 to 70 weight percent acrylonitrile, 20 to 94 weight percent of an acrylic ester, and 16 to 40 weight percent of a sulfonic acid-containing monomer containing a methallylsulfonic acid or methallylsulfonic acid metal salt, and no halogen-containing monomer. Some examples of the fibers contain from 10 to 50 percent voids, and shrink at least 15 percent (and often over 30 percent) at from 100 to 150° C. in 20 minutes. They may be crimped before use.

KB Seiren Ltd. has described in U. S. Patent Application Publication No. 2010/0137527, which is herein incorporated by reference, a fiber that is suitable for shrinkable materials. It is a highly shrinkable (for example in boiling water) fiber that is composed of a mixture of a nylon-MXD6 polymer (a crystalline polyamide obtained from a polymerization reaction of metaxylenediamine and adipic acid) and a nylon-6 polymer in a weight ratio of from 35:65 to 70:30. The fiber is made by melt spinning and drawing or draw-twisting. The fiber shrinks 43 to 53 percent in hot water at from 90 to 100° C. Inorganic particles, for example $TiO_2$, may be added to improve the spinning process.

Shimadzu Corporation described in U.S. Pat. No. 6,844,063, which is herein incorporated by reference, a core-sheath conjugated fiber, that is suitable as a shrinkable material, made from a sheath of (A) a low heat-shrinkability component that is a highly crystalline aliphatic polyester (having a melting point above 140° C.) and a core of (B) a high heat-shrinkability polymer containing at least 10 percent by weight of a low crystallinity aliphatic polyester having a melting point lower than that of component (A) by at least 20° C. The difference in shrinkability is at least 3 percent, or about 5 to 70 percent, and or about 10 to about 50 percent.

Kanebo Ltd. described, in Japanese Patent No. JP 7-305225, which is herein incorporated by reference, highly shrinkable polyester staple polymers obtained by melt-spinning a polymer made from a polyethylene terephthalate and subjecting it to specified melt-spinning drawing and post-treating processes under specified conditions. Examples include polyethylene terephthalate core-sheath structures with in which the core and sheath have different crystallinities.

U.S. Pat. No. 6,844,062, which is herein incorporated by reference, describes spontaneously degradable fibers and goods made with fibers having a core-sheath structure including (A) a low heat-shrinkable fiber component comprising a high crystalline aliphatic polyester and (B) a high heat-shrinkable fiber component comprising an aliphatic polyester, for example a low crystalline or non-crystalline aliphatic polyester. Examples of polymer (A) include homopolymers such as polybutylene succinate (melting point about 116° C.), poly-L-lactic acid (m.p. 175° C.), poly-D-lactic acid (m.p. 175° C.), polyhydroxybutyrate (m.p. 180° C.) and polyglycolic acid (m.p. 230° C.), and copolymers or mixtures of these with small amounts of other components. Polymer (B) is a component having a low crystallinity and a high heat shrinkability. The component used for the copolymerization or mixing with the homopolymers with high melting point such as polybutylene succinate, polylactic acid, polyhydroxybutyrate and polyglycolic acid can be suitably selected from the raw materials for the preparation of the above-mentioned aliphatic polyesters.

Yet another suitable shrinkable material is described in U.S. Pat. No. 5,635,298, which is herein incorporated by reference. It is a monofilament having a core-sheath structure including a core of a thermoplastic polyester or copolyester and a sheath of a thermoplastic polyester, in which the polyester or copolyester of the core has a melting point of 200 to 300° C., or of about 220 to 285° C., and includes at least 70 mole percent, based on the totality of all polyester structural units, of structural units derived from aromatic dicarboxylic acids and from aliphatic diols, and not more than 30 mole percent, based on the totality of all polyester structural units, of dicarboxylic acid units which differ from the aromatic dicarboxylic acid units which form the predominant portion of the dicarboxylic acid units, and diol units derived from aliphatic diols and which differ from the diol units which form the predominant portion of the diol units, and the sheath is made of a polyester mixture containing a thermoplastic polyester whose melting point is between 200 and 300° C., or of about between 220 and 285° C., and a thermoplastic, elastomeric copolyether-ester with or without customary nonpolymeric additives. The core-sheath monofilaments, if the core and sheath materials are separately melted and extruded, then cooled, then subjected to an afterdraw and subsequently heat-set, all under conditions as specified in the patent, may have a dry heat shrinkage at 180° C. of from 2 to 30 percent.

U.S. Pat. No. 5,688,594, which is herein incorporated by reference, describes a hybrid yarn, the fibers of which are suitable shrinkable materials for embodiments described herein. The hybrid yarn contains at least two varieties of filaments: (A) has a dry heat shrinkage of less than 7.5%, and (B) has a dry heat shrinkage of above 10%. Appropriate heating forces the lower-shrinking filaments to undergo crimping or curling. (A) is, for example, aramid, polyester, polyacrylonitirile, polypropylene, polyetherketone, polyetheretherketone, polyoxymethylene, metal, glass, ceramic or carbon, and (B) is, for example, drawn polyester, polyamide, polyethylene terephthalate, or polyetherimide.

In general, the lower limit for fiber diameter for typical shrinkable organic fibers may be about 1.3 dtex (11 microns), which is based primarily on current manufacturing limitations. The upper limit is based on limitations of typical oilfield pumping equipment. On a weight basis, the larger the fiber diameter, the less the total fiber length that is pumped and the fewer fiber filaments are pumped. However, in embodiments described here, shrinkable fibers are pumped along with proppant. Under such circumstances up to about 4.4 dtex fiber can be pumped with present-day equipment. The length of the shrinkable fibers prior to shrinkage may be about 1 mm to 5 cm, or from 3 mm to 3 cm.

The shrinkable fibers included in the slurry may allow for agglomerations to be formed during a diverting and/or plugging treatment, and can enhance the bridging mechanism. The agglomerations formed by the shrinkable fibers may be small enough to pass through perforation entrance within the wellbore but may allow for a plugging of a fracture or desired perforation by wedging in, or bridging the fracture or perforation tunnel.

Shrinkable fibers may be used alone or mixed with a choice or mixture of chemically active and/or chemically inert materials. By non-limiting example, elongated particles, including small particles, may be used in the slurry.

Along with the shrinkable fibers, the slurry may further include a plurality of small particles. These small particles may be any suitable particles, including but not limited to particles of a size smaller than about 1000 microns or about 800 microns. In some embodiments, the small particles may be of a size in a range of 20/40 mesh, which corresponds to a size range of 432 to 838 microns. Even smaller particles may be used, such as 100-mesh size particles (150 microns). Alternatively or additionally, one skilled in the art may understand small particles to be particles of a size capable of being grabbed by and/or entangled within the shrinkable fibers.

The small particles may be non-degradable, such as particles of a proppant and/or sand, but also may be degradable. The small particles can be of any suitable shape. If non-degradable, the particles can be left behind as proppant for the fracture. If that is the case, then sphericity of the proppant may be considered to select the appropriate small particles so as to ensure conductivity of the fracture.

In embodiments, the shrinkable material may be in the form of flakes, beads, hollow beads, spheres, ovals, rods, pellets, platelets, disks, plates or ribbons, and combinations thereof.

In embodiments, the shrinkable material may be a composite material. The composite may be a combination of degradable and non-degradable material. The composite may also be made of various degradable materials. Combinations include a polymer with degradation accelerators such as inorganic base, an organic base, a base precursor, an acid, or acid precursor, and mixtures thereof. The polymer might be any one and combinations of shrinkable polymers listed herein; the inorganic base may include sodium hydroxide, potassium hydroxide, magnesium hydroxide, ammonium hydroxide, calcium carbonate, sodium carbonate, sodium bicarbonate, or magnesium oxide, and mixtures thereof. Base may include amines derivatives. Acid may include mineral acids such as hydrochloric acid (HCl), nitric acid, phosphoric acid, sulfuric acid, boric acid, hydrofluoric acid, hydrobromic acid, perchloric acid, or derivatives; or organic acids such as formic acid, citric acid, acetic acid, glycolic acid, dicarboxylic acids (including oxalic acid, malonic acid, succinic acid, glutaric acid, adipic acid, pimelic acid and the like), tricarboxylic acids, aminocarboxylic acids, chloroacetic acid, hydroxyacetic acid and mixtures thereof. Acid precursor may be aliphatic polyesters; glucono-delta-lactone; glucoheptonic lactone; poly($\epsilon$-caprolactones); poly(hydroxybutyrates); poly(anhydrides); aliphatic polycarbonates; poly(amino acids); polyphosphazenes; poly(ortho esters); orthoesters; monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, or poly(glycolides), and mixtures thereof.

The slurry to be used in the treatment may further include a carrier fluid such as a linear gel. The carrier fluid may be included as a part of the slurry or pill, and/or using one or more spacers. The use of spacers is optional. In the embodiments described further herein, the slurry includes a pill comprising the shrinkable fibers. However, the use of a pill is not necessary, and including the shrinkable fibers within a slurry (that may or may not have the structure of a pill) is understood to be within the scope of this disclosure.

Figure 1A:
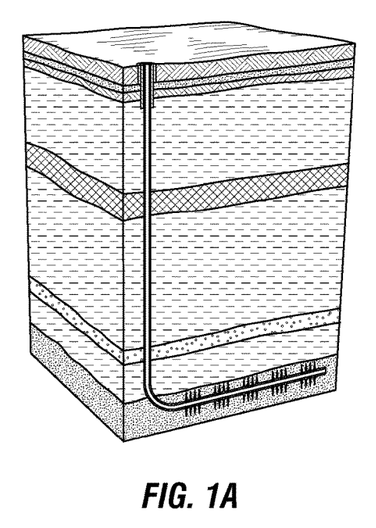
FIGS. 1A and 1B show diagrams of a slurry according to one or more aspects.
Figure 1B:
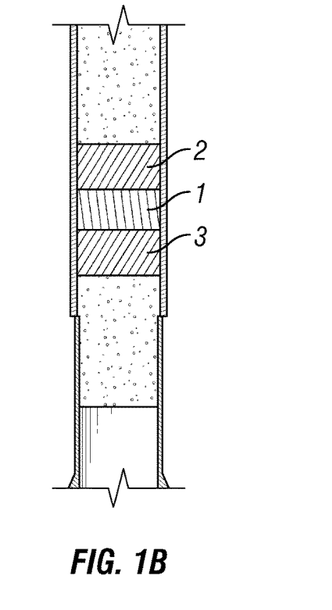

Referring to FIG. 1A, and particularly to FIG. 1B which is an exploded view of a portion of FIG. 1A, in embodiments using spacers, the slurry to be used in the treatment may include a first spacer 2, the diversion pill 1 including the plurality of shrinkable materials and/or plurality of small particles, and a second spacer 3. The diversion pill 1 may be placed in between the first spacer 2 and second spacer 3, though other arrangements of at least one diversion pill with one or more spacers is also possible. The first and second spacers may include a combination of a base fluid such as WF 1000 guar based gel, or any other suitable fluids, and fibers. The types of fibers included in the spacers may be non-shrinkable, as their function may be for stabilization of fluid fronts so as to prevent dispersion and dilution of the plugging material. In some treatments, including slickwater treatments, the spacers may not include any fibers or spacers may not be included at all.

The slurry according to some embodiments thus may include a diversion pill including shrinkable fibers and/or including additional small particles, and one or more spacers including a base fluid and fibers. In some embodiments, the amount of shrinkable fibers in the pill may be about 20 pounds per thousand gallons (ppt) to about 200 ppt, or about 50 ppt to about 150 ppt. The amount of small particles in the pill may be about 20 ppt to 5000 ppt, or about 100 ppt to 1000 ppt. The amount of fibers in the first and second spacers may be about 20 ppt to about 100 ppt, or about 30 ppt to about 60 ppt. The slurry may include a carrier fluid. A ratio of the shrinkable fibers as compared to small particles may be from about 0.1 to about 1, or about 0.2 to about 0.7.

After designing of the slurry, the slurry including at least the diversion pill can be delivered from the wellbore surface to a downhole portion of the wellbore so as to reach a fracture in the wellbore. In some situations, the slurry includes about 5 bbls to about 80 bbls of a carrier fluid, such as water, gel or the like in addition to the diversion pill. The carrier fluid may further include a viscosifier such as guar or a surfactant. The carrier fluid may be a water-based carrier fluid that contains an amount of guar, such as about 20 ppt. The slurry may be pumped downhole to a distance of about 200 feet to 20,000 feet from the surface of the wellbore. The slurry may be pumped downhole until it reaches a fracture or other location where a diverting or plugging action may commence.

Figure 2:
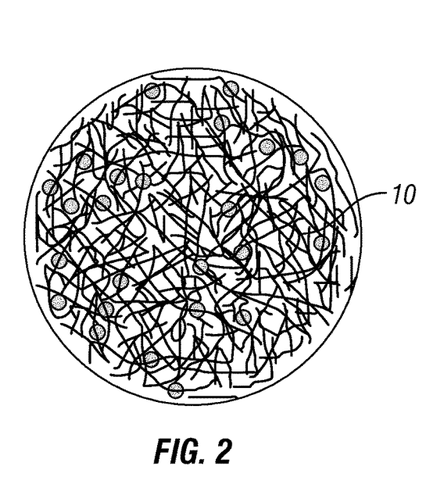
FIG. 2 shows a diagram of fibers before shrinking according to one or more aspects.

Referring to FIG. 2, the fibers 10 are a part of a homogenous pill when the pill and particularly the shrinkable fibers are below a predetermined temperature threshold. Such a homogenous pill may be a well-dispersed pill, which may include a pill where the ratio of solid to liquid is substantially equal at each volume element of the pill.

At some point between the designing and preparation of the slurry and the completion of the diverting or plugging action, at least some of the plurality of shrinkable fibers will undergo a shrinking process. The shrinking of the shrinkable fibers may begin in response to a temperature of the pill, which may be increased mechanically, chemically, and/or electrically. The temperature of the pill may be manipulated by a user, such as on a wellbore surface or at a distance below the wellbore surface. The temperature of the pill may alternatively or additionally change in connection with a higher ambient temperature as the slurry travels down the wellbore. The pill and particularly the shrinkable fibers may be particularly designed and selected in view of temperature thresholds of such shrinkable fibers, and thus may be selected based upon their ability to shrink in response to a controlled or ambient temperature at a point prior to or during injection.

Figure 3:
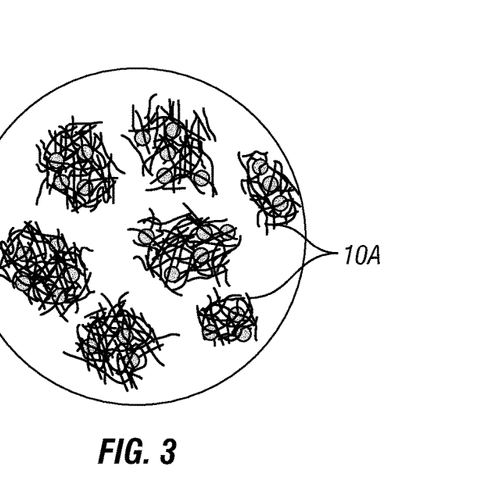
FIG. 3 shows a diagram of fibers after shrinking according to one or more aspects.

Referring to FIG. 3, once the temperature of the pill and particularly the shrinkable fibers increases above the predetermined temperature threshold, solid agglomerations 10A of the fibers may be formed. The agglomerations may be formed as the shrinkable fibers commence their shrinking, and may be formed along with other small particles within the pill. The agglomerations 10A may then be used to create chemical plugs to be used to plug a fracture or other perforation and allow for a diverting treatment to commence.

The predetermined temperature threshold may be any suitable temperature to enable the shrinkable fibers to shrink to a predetermined percentage. For example, shrinkage of about 20 to about 80 percent of the shrinkable fibers' initial length, or shrinkage of from about 40 to about 70 percent of the shrinkable fibers' initial length, may be effected. The temperature that causes the fibers to begin shrinking may be about 20 to about 100° C., or about 30 to about 50° C., or about 40 to about 42° C.

The shrinkable fibers may begin shrinking at any point prior to or during pumping. In some embodiments, the shrinking may occur at any distance within the near field of fracture, such as at a distance of up to 50 feet below the wellbore surface, or up to about 10 feet below the wellbore surface, or up to about 5 feet below the wellbore surface.

The shrinkable fibers may additionally or alternatively begin shrinking at the wellbore surface. In such a situation, the mechanism allowing for the injection of the pill including the shrinkable fibers may relate to a split-stream configuration, which is generally discussed in U.S. Provisional Patent Application No. 61/914,073.

Figure 4:
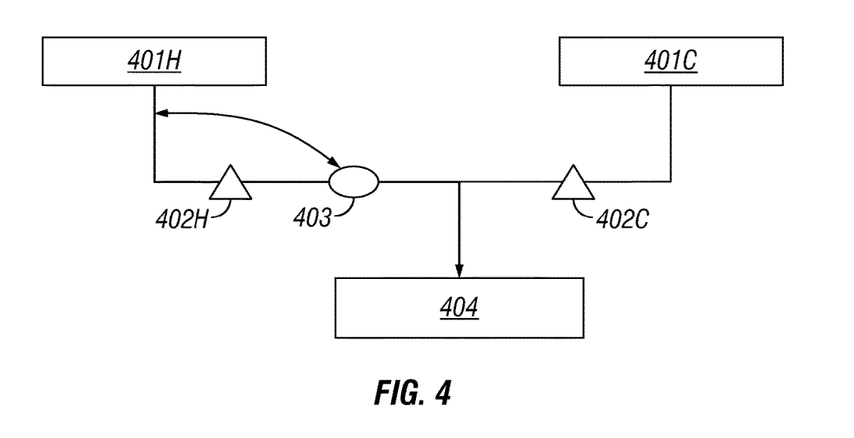
FIG. 4 shows a diagram of a treatment configuration according to one or more aspects.

Referring to FIG. 4, in such a split-stream configuration, a hot stream 401H and a cold stream 401C are used in a downhole operation 404. The hot stream may include a composition such as a linear gel carrier fluid, and may be void of any solids. The hot stream 401H will pass through a pump 403, and also will pass through a heating element 402H, such as a friction fluid heater. The heater may be upstream or downstream from the pump.

A cold stream 401C may include a composition including a linear gel carrier fluid, and may include shrinkable fibers in their unshrunk state. The cold stream may include other solids that will be a part of the plugging material, such as small particles. The cold stream 401C including the unshrunk particles will pass through a pump 402C.

At a point after the hot stream 401H has been pumped and heated, and after the cold stream 401C has been pumped, the hot streams and cold streams will mix, to thereby form a slurry. At this location, the shrinking of the shrinkable fibers will commence. This location may be at particular location on the surface of the wellbore. The slurry including the hot stream and the cold streams may then enter the wellbore and can be used in a plugging operation. By having the shrinkable fibers shrink after the pumping operation, the fibers will not be in their shrunk form when entering the pumps, and damage to the pumps may be avoided. Further, when a friction fluid heater is used, the heater may have flow restrictions. Heating the portion of the fluid that has no solid (e.g., the hot stream) may then avoid any risk of accidental plugging of the fluid heater.

Figure 5:
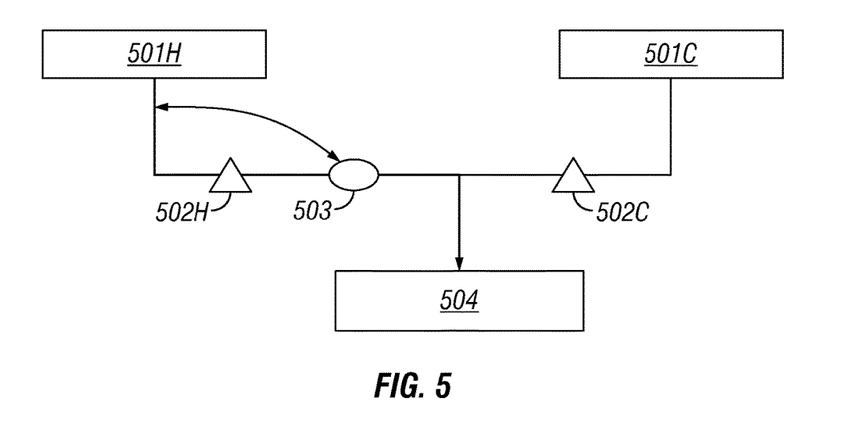
FIG. 5 shows a diagram of a treatment configuration according to one or more aspects.

Referring to FIG. 5, a configuration similar to FIG. 4 is shown. However, in FIG. 5, the hot stream, while it may not include the shrinkable fibers, may include other solids that will enter the slurry of the plugging material, such as the small fibers. The cold stream may include the unshrunk fibers, and may or may not include additional solid components.

Figure 6:
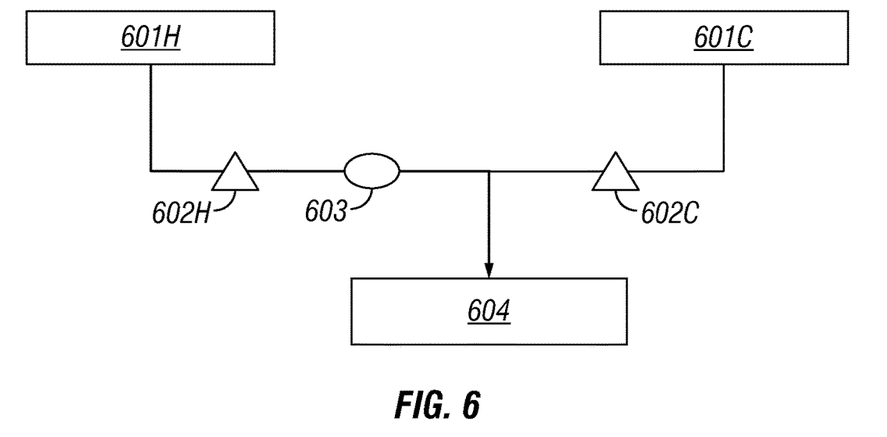
FIG. 6 shows a diagram of a treatment configuration according to one or more aspects.

Referring to FIG. 6, a configuration similar to FIGS. 4 and 5 is shown. However, in FIG. 6, the hot stream includes both the unshrunk fibers and other solids entering the slurry of the plugging material, such as the small particles. The cold stream may thus include just the carrier fluid. In such an embodiment, the heater may be positioned downstream of the pump, so as to ensure that the shrinkable fibers are in their unshrunk orientation when passing through the pump, which may avoid accidental damage to the pump.

In the embodiments described above, the heater may heat the hot stream so as to raise the temperature of the stream to a value sufficient for shrinking the shrinkable fibers. The temperature of the fibers in the hot stream may be raised by the heater to about 30 to about 50° C., or about 35 to about 45° C., or about 40 to about 42° C.

In the embodiments described above, diversion and plugging of fractures may advantageously occur, and a fracturing treatment may be performed efficiently, without risk pump breakdown from slurries have larger sized particles being pumped at the surface.

After the fracturing treatment is completed, degradation of at least some portions of the plug may commence. The shrinkable fibers and/or small particles may be made of degradable material, which may degrade after a predetermined time. The degradation may occur mechanically, chemically or electrically, and may be owed to the degradable material within the slurry and/or shrinkable fibers themselves. In embodiments where degradable material in addition to the shrinkable fibers is used, the degradable material may include one or more of powder, beads, chips and an additive for accelerating degradation. Owing to this degradation, the plug of a fracture may disappear and hydrocarbon may flow into the wellbore.

Although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A method for treating a subterranean formation, comprising:
    injecting, into the subterranean formation, a slurry comprising at least a carrier fluid and a shrinkable material;
    forming a plug in a fracture or perforation in the subterranean formation using, at least in part, the shrinkable material,
    wherein the shrinkable material is adapted to shrink in response to an increase in temperature of the slurry above a threshold value,
    and wherein the shrinkable material is a two-component fiber comprising a core material and a sheath material having different melting points.

2. The method for treating the subterranean formation according to claim 1, wherein the shrinkable material degrades after a predetermined time, thus disintegrating the plug as a response to the degradation.

3. The method for treating the subterranean formation according to claim 1, wherein the shrinkable material comprises at least one amorphous polymer.

4. The method for treating the subterranean formation according to claim 1, wherein the shrinkable material further comprises a plurality of particles, the plurality of particles having a size of about 800 microns or less.

5. The method for treating the subterranean formation according to claim 1, wherein the carrier fluid comprises at least one spacer, the at least one spacer comprising a linear gel.

6. A method for plugging a fracture or perforation of a subterranean formation, comprising:
    injecting a plurality of shrinkable material into a wellbore of the subterranean formation;
    subjecting the plurality of shrinkable material to a temperature at or above a predetermined temperature threshold, thereby shrinking the plurality of shrinkable material to form a plurality of shrunk material,
    wherein the shrinkable material is a two-component fiber comprising a core material and a sheath material having different melting points; and
    plugging the fracture or perforation with the plurality of shrunk material.

7. The method for plugging the fracture or perforation according to claim 6, wherein the increasing the temperature to the predetermined temperature threshold occurs prior to injecting the plurality of shrinkable material into the wellbore.

8. The method for plugging the fracture or perforation according to claim 6, wherein the increasing the temperature to the predetermined temperature threshold occurs during or after injecting the plurality of shrinkable material into the wellbore.

9. A method for plugging a fracture or perforation of a subterranean formation using a slurry comprising a plurality of shrinkable material and a plurality of particles, the method comprising:
    subjecting the plurality of shrinkable material to a temperature at or above a predetermined temperature threshold, thereby shrinking the plurality of shrinkable material to form a plurality of shrunk material,
    wherein the shrinkable material is a two-component fiber comprising a core material and a sheath material having different melting points;
    after at least some of the plurality of shrinkable material is shrunk, injecting the slurry comprising the plurality of shrinkable material and the plurality of particles into a wellbore; and
    plugging the fracture or perforation with the plurality of shrunk material and the particles.

10. The method for plugging the fracture or perforation according to claim 9, wherein the increasing of the temperature occurs at a surface.

11. The method for plugging the fracture or perforation according to claim 9, wherein the predetermined temperature threshold is about 40 to about 42° C.

12. The method for plugging the fracture or perforation according to claim 9, wherein the subjecting the plurality of shrinkable material to the temperature at or above the predetermined temperature threshold further comprises:
    injecting a first portion of a composition through a heated stream, the heated stream being heated by a fluid heater.

13. The method for plugging the fracture or perforation according to claim 12, wherein the fluid heater heats the first portion of the composition in a hot stream by friction fluid heating.

14. The method for plugging the fracture or perforation according to claim 12, wherein the first portion of the composition does not include any of the plurality of shrinkable material.

15. The method for plugging the fracture or perforation according to claim 14, wherein the fluid heater is oriented upstream or downstream of a pump used to pump the first portion of the composition.

16. The method for plugging the fracture or perforation according to claim 12, wherein the first portion of the composition comprises at least some of the plurality of shrinkable material.

17. The method for plugging the fracture or perforation according to claim 16, wherein the fluid heater is oriented downstream of a pump used to pump the first portion of the composition.

18. The method for plugging the fracture or perforation according to claim 12, further comprising injecting a second portion of the composition through a non-heated stream, the second portion of the composition combining with the first portion of the composition at a predetermined location on a surface or in the wellbore to thereby form a slurry.

19. The method for plugging the fracture or perforation according to claim 18, wherein the first portion of the composition and the second portion of the composition combine prior to injection into the wellbore.

* * * * *